US008861806B2

(12) United States Patent
Steinberg et al.

(10) Patent No.: US 8,861,806 B2
(45) Date of Patent: *Oct. 14, 2014

(54) REAL-TIME FACE TRACKING WITH REFERENCE IMAGES

(71) Applicant: DigitalOptics Corporation Europe Limited, Galway (IE)

(72) Inventors: Eran Steinberg, San Francisco, CA (US); Peter Corcoran, Claregalway (IE); Petronel Bigioi, Galway (IE); Alexei Pososin, Galway (IE); Alexandru Drimbarean, Galway (IE); Florin Nanu, Bucharest (RO); Stefan Petrescu, Bucharest (RO)

(73) Assignee: DigitalOptics Corporation Europe Limited, Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 13/964,632

(22) Filed: Aug. 12, 2013

(65) Prior Publication Data

US 2013/0329955 A1 Dec. 12, 2013

Related U.S. Application Data

(63) Continuation of application No. 12/619,587, filed on Nov. 16, 2009, now Pat. No. 8,509,496, which is a (Continued)

(51) Int. Cl.
*G06K 9/00* (2006.01)
*G06T 7/20* (2006.01)
*G06K 9/36* (2006.01)
*G06K 9/32* (2006.01)

(52) U.S. Cl.
CPC .... *G06K 9/00255* (2013.01); *G06K 2009/3291* (2013.01); *G06T 7/2046* (2013.01); *G06K 9/00228* (2013.01); *G06T 2207/30201* (2013.01); *G06T 2207/10016* (2013.01); *G06T 2207/20016* (2013.01)

USPC .......................................... 382/118; 382/103

(58) Field of Classification Search
USPC ......... 382/103, 115, 117–118, 164, 173, 181, 382/190, 218, 224, 254, 276–277, 284, 298, 382/299, 305; 358/515, 538
See application file for complete search history.

(56) References Cited

U.S. PATENT DOCUMENTS 7,315,631 B1 * 1/2008 Corcoran et al. ............. 382/118
7,403,643 B2 * 7/2008 Ianculescu et al. ........... 382/118

(Continued)

OTHER PUBLICATIONS

Non-Final Rejection, dated Sep. 20, 2012, for U.S. Appl. No. 12/814,245, filed Jun. 11, 2010.

(Continued)

*Primary Examiner* — Amir Alavi
(74) *Attorney, Agent, or Firm* — Hickman Palermo Truong Becker Bingham Wong LLP

(57) ABSTRACT

A method of tracking a face in a reference image stream using a digital image acquisition device includes acquiring a full resolution main image and an image stream of relatively low resolution reference images each including one or more face regions. One or more face regions are identified within two or more of the reference images. A relative movement is determined between the two or more reference images. A size and location are determined of the one or more face regions within each of the two or more reference images. Concentrated face detection is applied to at least a portion of the full resolution main image in a predicted location for candidate face regions having a predicted size as a function of the determined relative movement and the size and location of the one or more face regions within the reference images, to provide a set of candidate face regions for the main image.

34 Claims, 3 Drawing Sheets

Related U.S. Application Data continuation of application No. 12/141,042, filed on Jun. 17, 2008, now Pat. No. 7,620,218, and a continuation-in-part of application No. 12/063,089, filed on Feb. 6, 2008, now Pat. No. 8,055,029, which is a continuation-in-part of application No. 11/766,674, filed on Jun. 21, 2007, now Pat. No. 7,460,695, which is a continuation-in-part of application No. 11/753,397, filed on May 24, 2007, now Pat. No. 7,403,643, which is a continuation-in-part of application No. 11/464,083, filed on Aug. 11, 2006, now Pat. No. 7,315,631.

(60) Provisional application No. 60/945,558, filed on Jun. 21, 2007.

(56) References Cited

U.S. PATENT DOCUMENTS

| | | | | |
|---|---|---|---|---|
| 7,460,694 B2* | 12/2008 | Corcoran et al. | | 382/118 |
| 7,460,695 B2* | 12/2008 | Steinberg et al. | | 382/118 |
| 7,469,055 B2* | 12/2008 | Corcoran et al. | | 382/118 |
| 7,606,397 B2* | 10/2009 | Kowald | | 382/118 |
| 7,620,218 B2* | 11/2009 | Steinberg et al. | | 382/118 |
| 7,864,990 B2* | 1/2011 | Corcoran et al. | | 382/118 |
| 7,916,182 B2 | 3/2011 | Itoh | | |
| 7,916,897 B2* | 3/2011 | Corcoran et al. | | 382/103 |
| 8,050,465 B2* | 11/2011 | Ianculescu et al. | | 382/118 |
| 8,055,029 B2* | 11/2011 | Petrescu et al. | | 382/118 |
| 8,149,324 B2 | 4/2012 | Oikawa | | |
| 8,155,397 B2 | 4/2012 | Bigioi et al. | | |
| 8,159,599 B2 | 4/2012 | Takamiya | | |
| 8,160,310 B2 | 4/2012 | Takayama | | |
| 8,270,674 B2* | 9/2012 | Corcoran et al. | | 382/103 |
| 8,385,610 B2* | 2/2013 | Corcoran et al. | | 382/118 |
| 8,422,739 B2* | 4/2013 | Ianculescu et al. | | 382/103 |
| 8,509,496 B2* | 8/2013 | Steinberg et al. | | 382/118 |
| 2002/0136448 A1 | 9/2002 | Bortolussi et al. | | |
| 2009/0028394 A1 | 1/2009 | Hosoi et al. | | |
| 2009/0141974 A1 | 6/2009 | Ono | | |
| 2010/0060727 A1 | 3/2010 | Steinberg et al. | | |
| 2011/0026780 A1 | 2/2011 | Corcoran et al. | | |
| 2013/0243273 A1* | 9/2013 | Yamaji et al. | | 382/118 |

OTHER PUBLICATIONS

Notice of Allowance, dated Jan. 18, 2013, for U.S. Appl. No. 12/814,245, filed Jun. 11, 2010.

* cited by examiner

REAL-TIME FACE TRACKING WITH REFERENCE IMAGES

PRIORITY AND RELATED APPLICATIONS

This application is a continuation of U.S. patent application Ser. No. 12/619,587, filed Nov. 16, 2009, now U.S. Pat. No. 8,509,496 which is a continuation of U.S. patent application Ser. No. 12/141,042, filed Jun. 17, 2008, now U.S. Pat. No. 7,620,218, which claims benefit of U.S. provisional application 60/945,558, filed Jun. 21, 2007, and is a CIP of Ser. No. 12/063,089, filed Feb. 6, 2008, now U.S. Pat. No. 8,055,029, which is a CIP of U.S. Ser. No. 11/766,674, filed Jun. 21, 2007, now U.S. Pat. No. 7,460,695, which is a CIP of U.S. Ser. No. 11/753,397, filed May 24, 2007, now U.S. Pat. No. 7,403,643, which is a CIP of U.S. Ser. No. 11/464,083, filed Aug. 11, 2006, now U.S. Pat. No. 7,315,631.

This application is also related to U.S. patent application Ser. No. 11/573,713, filed Feb. 14, 2007, now U.S. Pat. No. 7,868,922, which claims priority to U.S. provisional patent application No. 60/773,714, filed Feb. 14, 2006, and to PCT application no. PCT/EP2006/008229, filed Aug. 15, 2006.

This application also is related to Ser. No. 11/024,046, filed Dec. 27, 2004, now U.S. Pat. No. 7,565,030, which is a CIP of U.S. patent application Ser. No. 10/608,772, filed Jun. 26, 2003, now U.S. Pat. No. 7,440,593. This application also is related to PCT/US2006/021393, filed Jun. 2, 2006, which is a CIP of Ser. No. 10/608,784, filed Jun. 26, 2003.

This application also is related to U.S. application Ser. No. 10/985,657, filed Nov. 10, 2004 now U.S. Pat. No. 7,636,486.

This application also is related to U.S. application Ser. No. 11/462,035, filed Aug. 2, 2006, now U.S. Pat. No. 7,920,723, which is a CIP of U.S. application Ser. No. 11/282,954, filed Nov. 18, 2005, now U.S. Pat. No. 7,689,009.

This application also is related to Ser. No. 11/233,513, filed Sep. 21, 2005, now U.S. Pat. No. 7,587,085, which is a CIP of U.S. application Ser. No. 11/182,718, filed Jul. 15, 2005, now Abandoned, which is a CIP of U.S. application Ser. No. 11/123,971, filed May 6, 2005, now U.S. Pat. No. 7,436,998, and which is a CIP of U.S. application Ser. No. 10/976,336, filed Oct. 28, 2004, now U.S. Pat. No. 7,536,036.

This application also is related to U.S. patent application Ser. No. 11/460,218, filed Jul. 26, 2006, now U.S. Pat. No. 7,792,335, which claims priority to U.S. provisional patent application Ser. No. 60/776,338, filed Feb. 24, 2006.

This application also is related to U.S. patent application Ser. No. 11/674,650, filed Feb. 13, 2007, now U.S. Pat. No. 7,702,236, which claims priority to U.S. provisional patent application Ser. No. 60/773,714, filed Feb. 14, 2006.

This application is related to U.S. Ser. No. 11/836,744, filed Aug. 9, 2007, now U.S. Pat. No. 8,073,286, which claims priority to U.S. provisional patent application Ser. No. 60/821,956, filed Aug. 9, 2006.

This application is related to a family of applications filed contemporaneously by the same inventors, including an application entitled DIGITAL IMAGE ENHANCEMENT WITH REFERENCE IMAGES, application Ser. No. 12/140, 048, and another entitled METHOD OF GATHERING VISUAL META DATA USING A REFERENCE IMAGE, application Ser. No. 12/140,125, now U.S. Pat. No. 8,330, 831, and another entitled IMAGE CAPTURE DEVICE WITH CONPEMPORANEOUS REFERENCE IMAGE CAPTURE MECHANISM, application Ser. No. 12/140,532, and another entitled FOREGROUND/BACKGROUND SEPARATION USING REFERENCE IMAGES, application Ser. No. 12/140,827 and another entitled MODIFICATION OF POST-VIEWING PARAMETERS FOR DIGITAL IMAGES USING IMAGE REGION OR FEATURE INFORMATION, application Ser. No. 12/140,950 and another entitled METHOD AND APPARATUS FOR RED-EYE DETECTION USING PREVIEW OR OTHER REFERENCE IMAGES, application Ser. No. 12/142,134, now U.S. Pat. No. 8,320,641.

All of these priority and related applications, and all references cited below, are hereby incorporated by reference.

FIELD OF THE INVENTION

The present invention provides an improved method and apparatus for image processing in acquisition devices. In particular the invention provides improved real-time face tracking in a digital image acquisition device.

BACKGROUND OF THE INVENTION

Face tracking for digital image acquisition devices describe methods of marking human faces in a series of images such as a video stream or a camera preview. Face tracking can be used for indication to the photographer the locations of faces in an image, improving the acquisition parameters, or for allowing post processing of the images based on knowledge of the location of faces.

In general, face tracking systems employ two principle modules: (i) a detection module for location of new candidate face regions in an acquired image or a sequence of images; and (ii) a tracking module for confirmed face regions.

A well-known fast-face detection algorithm is disclosed in US 2002/0102024, Violla-Jones. In brief, Viola-Jones first derives an integral image from an acquired image—usually an image frame in a video stream. Each element of the integral image is calculated as the sum of intensities of all points above and to the left of the point in the image. The total intensity of any sub-window in an image can then be derived by subtracting the integral image value for the top left point of the sub-window from the integral image value for the bottom right point of the sub-window. Also intensities for adjacent sub-windows can be efficiently compared using particular combinations of integral image values from points of the sub-windows.

In Viola-Jones, a chain (cascade) of 32 classifiers based on rectangular (and increasingly refined) Haar features are used with the integral image by applying the classifiers to a sub-window within the integral image. For a complete analysis of an acquired image this sub-window is shifted incrementally across the integral image until the entire image has been covered.

In addition to moving the sub-window across the entire integral image, the sub window must also be scaled up/down to cover the possible range of face sizes. In Violla-Jones, a scaling factor of 1.25 is used and, typically, a range of about 10-12 different scales are required to cover the possible face sizes in an XVGA size image.

It will therefore be seen that the resolution of the integral image is determined by the smallest sized classifier sub-window, i.e. the smallest size face to be detected, as larger sized sub-windows can use intermediate points within the integral image for their calculations.

A number of variants of the original Viola-Jones algorithm are known in the literature. These generally employ rectangular, Haar feature classifiers and use the integral image techniques of Viola-Jones.

Even though Viola-Jones is significantly faster than other face detectors, it still requires significant computation and, on a Pentium class computer can just about achieve real-time performance. In a resource-restricted embedded system, such as hand held image acquisition devices (examples include digital cameras, hand-held computers or cellular phones equipped with cameras), it is not practical to run such a face detector at real-time frame rates for video. From tests within a typical digital camera, it is only possible to achieve complete coverage of all 10-12 sub-window scales with a 3-4 classifier cascade. This allows some level of initial face detection to be achieved, but with unacceptably high false positive rates.

US 2005/0147278, Rui et al describes a system for automatic detection and tracking of multiple individuals using multiple cues. Rui discloses using Violla-Jones as a fast face detector. However, in order to avoid the processing overhead of Violla-Jones, Rui instead discloses using an auto-initialization module which uses a combination of motion, audio and fast face detection to detect new faces in the frame of a video sequence. The remainder of the system employs well-known face tracking methods to follow existing or newly discovered candidate face regions from frame to frame. It is also noted that Rui requires that some video frames be dropped in order to run a complete face detection.

SUMMARY OF THE INVENTION

A method of face detection including tracking a face in a reference image stream using a digital image acquisition device includes acquiring a full resolution main image and an image stream of relatively low resolution reference images each including one or more face regions. One or more face regions are identified within two or more of the reference images. A relative movement is determined between the two or more reference images. A size and location of the one or more face regions is determined within each of the two or more reference images. Concentrated face detection is applied to at least a portion of the full resolution main image in a predicted location for candidate face regions having a predicted size as a function of the determined relative movement and the size and location of the one or more face regions within the reference images, to provide a set of candidate face regions for the main image. Image processing is applied to the main image based on information regarding the set of candidate face regions to generate a processed version of the main image. The method includes displaying, storing, or transmitting the processed version of the main image, or combinations thereof.

The indication of relative movement includes an amount and direction of movement.

The concentrated face detection includes prior to applying face detection to the main image, shifting associated set of candidate face regions as a function of the movement. The method may include shifting the face regions as a function of their size and as a function of the movement.

The method may include applying face detection to a region of a next acquired image including candidate regions corresponding to the previously acquired image expanded as a function of movement. The candidate regions of the next acquired image may be expanded as a function of their original size and as a function of movement.

The method may include selectively applying face recognition using a database to at least some of the candidate face regions to provide an identifier for each of one or more faces recognized in the candidate face regions; and storing said identifier for said each recognized face in association with at least one image of said image stream.

The method may include tracking candidate face regions of different sizes from a plurality of images of the image stream.

The method may include merging said set of candidate face regions with one or more previously detected face regions to provide a set of candidate face regions having different parameters.

The method may be performed periodically on a selected plurality of images of a reference image stream, wherein said plurality of images include a full resolution main acquired image chronologically following a plurality of preview images.

The method may include displaying an acquired image and superimposing one or more indications of one or more tracked candidate face regions on the displayed acquired image. The method may include storing at least one of the size and location of one or more of the set of candidate face regions in association with the main acquired image.

Responsive to the main image being captured with a flash, regions of the acquired image corresponding to the tracked candidate face regions may be analyzed for red-eye defects.

The method may include performing spatially selective post processing of the main acquired image based on the stored candidate face regions' size or location.

The stream of reference images may include a stream of preview images.

A digital image acquisition device is provided for detecting faces in an image stream including one or more optics and a sensor for acquiring the image stream, a processor, and a processor-readable medium having digital code embedded therein for programming the processor to perform a method of tracking faces in an image stream. The method includes receiving a new acquired image from a reference image stream including one or more face regions. An indication is received of relative movement of the new acquired image relative to a previously acquired image of the reference image stream. The previously acquired image has an associated set of candidate face regions each having a given size and a respective location. Adjusted face detection is applied to at least a portion of the new acquired image in the vicinity of the candidate face regions as a function of the movement, to provide an updated set of candidate face regions. Image processing is applied to the main image based on information regarding the candidate face regions to generate a processed version of the new acquired image. The method includes displaying, storing, or transmitting the processed version of the new acquired image, or combinations thereof.

The image acquisition device may include a motion sensor. The motion sensor may include an accelerometer and a controlled gain amplifier connected to the accelerometer. The apparatus may be arranged to set the gain of the amplifier relatively low for acquisition of a high resolution image and to set the gain of the amplifier relatively high during acquisition of a stream of relatively low resolution images. The motion sensor may include a MEMS sensor.

the method further comprises selectively applying face recognition using a database to at least some of said candidate face regions to provide an identifier for a face recognized in a candidate face region, and storing the identifier for the recognized face in association with the new acqu A method is further provided to detect faces in an image stream using a digital image acquisition device. The method includes receiving a first acquired image from a reference image stream including one or more face regions. A first acquired image is sub-sampled at a specified resolution one or more times to provide one or more sub-sampled images. One or more regions of said first acquired image are identified including the one or more face regions within the one or more sub-sampled images of the first acquired image with probabilities each above a predetermined threshold. A respective size and location are determined of each identified face region within the first acquired image. A second acquired image is received from the reference image stream. The method includes sub-sampling and applying face detection to one or more regions of the subsequent acquired image calculated as probably including one or more face regions corresponding to the one or more face regions identified in the first acquired image. A full resolution main image is acquired and image processing is applied based on the face detection applied to the first and second images of the reference image stream. The method includes displaying, storing, or transmitting the processed version of said main image, or combinations thereof.

The identification of face regions may be performed on the sub-sampled image.

Face detection may be performed with relaxed face detection parameters.

For a particular candidate face region associated with a previously acquired image of the image stream, the method may include enhancing a contrast of luminance characteristics of corresponding regions of the main image. The enhancing may be performed on the sub-sampled image.

Each new acquired image may be acquired with progressively increased exposure parameters until at least one candidate face region is detected.

The method may include tracking candidate face regions of different parameters from a plurality of images of the image stream.

A digital image acquisition device for detecting faces in an image stream including one or more optics and a sensor for acquiring said image stream, a processor, and a processor-readable medium having digital code embedded therein for programming the processor to perform any of the methods described above or below herein.

BRIEF DESCRIPTION OF THE DRAWINGS

Embodiments of the invention will now be described by way of example, with reference to the accompanying drawings, in which.

DETAILED DESCRIPTION OF THE EMBODIMENTS

Figure 1:
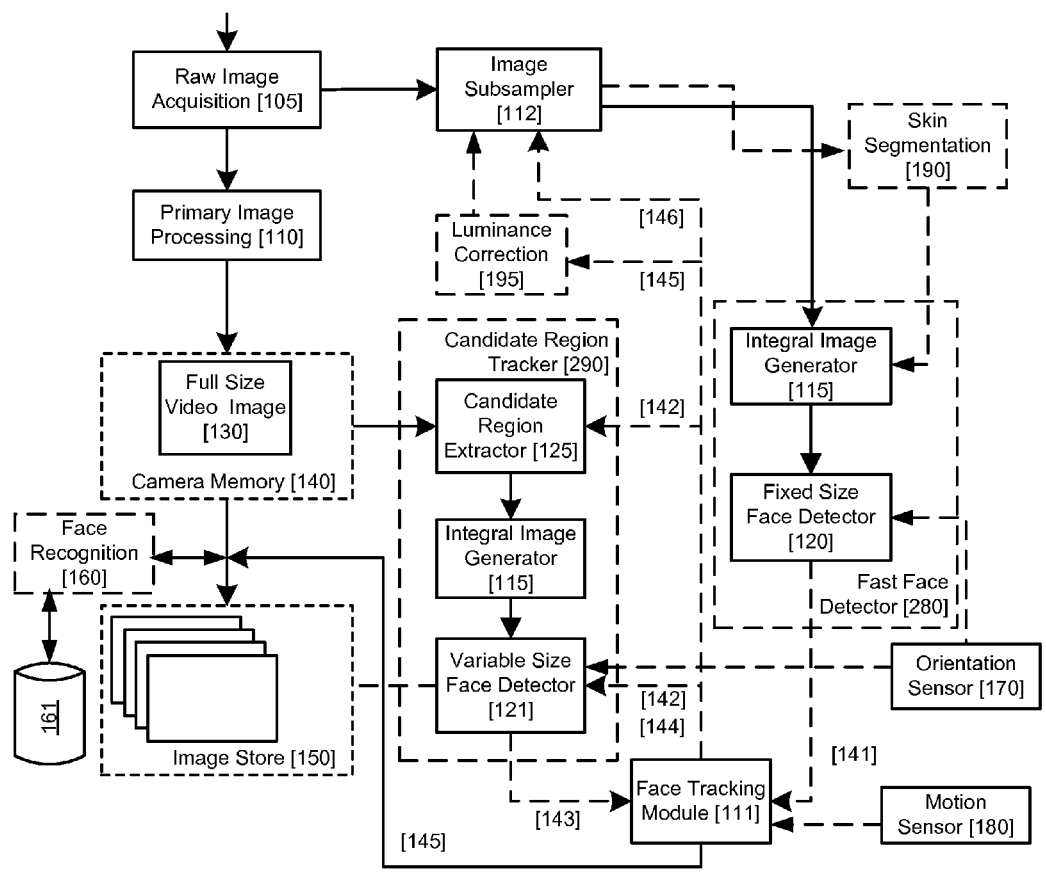
FIG. 1 is a block diagram illustrating the principle components of an image processing apparatus according to a preferred embodiment of the present invention.

Several embodiments are described herein that use information obtained from reference images for processing a main image. That is, the data that are used to process the main image come at least not solely from the image itself, but instead or also from one or more separate "reference" images.

Reference Image

Reference images provide supplemental meta data, and in particular supplemental visual data to an acquired image, or main image. The reference image can be a single instance, or in general, a collection of one or more images varying from each other. The so-defined reference image(s) provides additional information that may not be available as part of the main image.

Example of a spatial collection may be multiple sensors all located in different positions relative to each other. Example of temporal distribution can be a video stream.

The reference image differs from the main captured image, and the multiple reference images differ from each other in various potential manners which can be based on one or combination of permutations in time (temporal), position (spatial), optical characteristics, resolution, and spectral response, among other parameters.

One example is temporal disparity. In this case, the reference image is captured before and/or after the main captured image, and preferably just before and/or just after the main image. Examples may include preview video, a pre-exposed image, and a post-exposed image. In certain embodiments, such reference image uses the same optical system as the acquired image, while in other embodiments, wholly different optical systems or optical systems that use one or more different optical components such as a lens, an optical detector and/or a program component.

Alternatively, a reference image may differ in the location of secondary sensor or sensors, thus providing spatial disparity. The images may be taken simultaneously or proximate to or in temporal overlap with a main image. In this case, the reference image may be captured using a separate sensor located away from the main image sensor. The system may use a separate optical system, or via some splitting of a single optical system into a plurality of sensors or a plurality of sub-pixels of a same sensor. As digital optical systems become smaller dual or multi sensor capture devices will become more ubiquitous. Some added registration and/or calibration may be typically involved when two optical systems are used.

Alternatively, one or more reference images may also be captured using different spectral responses and/or exposure settings. One example includes an infra red sensor to supplement a normal sensor or a sensor that is calibrated to enhance specific ranges of the spectral response such as skin tone, highlights or shadows.

Alternatively, one or more reference images may also be captured using different capture parameters such as exposure time, dynamic range, contrast, sharpness, color balance, white balance or combinations thereof based on any image parameters the camera can manipulate.

Alternatively, one or more reference images may also be captured using a secondary optical system with a differing focal length, depth of field, depth of focus, exit pupil, entry pupil, aperture, or lens coating, or combinations thereof based on any optical parameters of a designed lens.

Alternatively, one or more reference images may also capture a portion of the final image in conjunction with other differentials. Such example may include capturing a reference image that includes only the center of the final image, or capturing only the region of faces from the final image. This allows saving capture time and space while keeping as reference important information that may be useful at a later stage.

Reference images may also be captured using varying attributes as defined herein of nominally the same scene recorded onto different parts of a same physical sensor. As an example, one optical subsystem focuses the scene image onto a small area of the sensor, while a second optical subsystem focuses the scene image, e.g., the main image, onto a much larger area of the sensor. This has the advantage that it involves only one sensor and one post-processing section, although the two independently acquired scene images will be processed separately, i.e., by accessing the different parts of the sensor array. This approach has another advantage, which is that a preview optical system may be configured so it can change its focal point slightly, and during a capture process, a sequence of preview images may be captured by moving an optical focus to different parts of the sensor. Thus, multiple preview images may be captured while a single main image is captured. An advantageous application of this embodiment would be motion analysis.

Getting data from a reference image in a preview or postview process is akin to obtaining meta data rather than the image-processing that is performed using the meta data. That is, the data used for processing a main image, e.g., to enhance its quality, is gathered from one or more preview or postview images, while the primary source of image data is contained within the main image itself. This preview or postview information can be useful as clues for capturing and/or processing the main image, whether it is desired to perform red-eye detection and correction, face tracking, motion blur processing, dust artefact correction, illumination or resolution enhancement, image quality determination, foreground/background segmentation, and/or another image enhancement processing technique. The reference image or images may be saved as part of the image header for post processing in the capture device, or alternatively after the data is transferred on to an external computation device. In some cases, the reference image may only be used if the post processing software determines that there is missing data, damaged data or need to replace portions of the data.

In order to maintain storage and computation efficiency, the reference image may also be saved as a differential of the final image. Example may include a differential compression or removal of all portions that are identical or that can be extracted from the final image.

Correcting Eye Defects

In one example involving red-eye correction, a face detection process may first find faces, find eyes in a face, and check if the pupils are red, and if red pupils are found, then the red color pupils are corrected, e.g., by changing their color to black. Another red-eye process may involve first finding red in a digital image, checking whether the red pixels are contained in a face, and checking whether the red pixels are in the pupil of an eye. Depending on the quality of face detection available, one or the other of these may be preferred. Either of these may be performed using one or more preview or postview images, or otherwise using a reference image, rather than or in combination with, checking the main image itself. A red-eye filter may be based on use of acquired preview, postview or other reference image or images, and can determine whether a region may have been red prior to applying a flash.

Another known problem involves involuntary blinking. In this case, the post processing may determine that the subject's eyes were closed or semi closed. If there exists a reference image that was captured time-wise either a fraction of a second before or after such blinking, the region of the eyes from the reference image can replace the blinking eye portion of the final image.

In some cases as defined above, the camera may store as the reference image only high resolution data of the Region of Interest (ROI) that includes the eye locations to offer such retouching.

Face Tools

Multiple reference images may be used, for example, in a face detection process, e.g., a selected group of preview images may be used. By having multiple images to choose from, the process is more likely to have a more optimal reference image to operate with. In addition, a face tracking process generally utilizes two or more images anyway, beginning with the detection of a face in at least one of the images. This provides an enhanced sense of confidence that the process provides accurate face detection and location results.

Moreover, a perfect image of a face may be captured in a reference image, while a main image may include an occluded profile or some other less than optimal feature. By using the reference image, the person whose profile is occluded may be identified and even have her head rotated and unblocked using reference image data before or after taking the picture. This can involve upsampling and aligning a portion of the reference image, or just using information as to color, shape, luminance, etc., determined from the reference image. A correct exposure on a region of interest or ROI may be extrapolated using the reference image. The reference image may include a lower resolution or even subsampled resolution version of the main image or another image of substantially a same scene as the main image.

Meta data that is extracted from one or more reference images may be advantageously used in processes involving face detection, face tracking, red-eye, dust or other unwanted image artefact detection and/or correction, or other image quality assessment and/or enhancement process. In this way, meta data, e.g., coordinates and/or other characteristics of detected faces, may be derived from one or more reference images and used for main image quality enhancement without actually looking for faces in the main image.

A reference image may also be used to include multiple emotions of a single subject into a single object. Such emotions may be used to create more comprehensive data of the person, such as smile, frown, wink, and/or blink. Alternatively, such data may also be used to post process editing where the various emotions can be cut-and-pasted to replace between the captured and the reference image. An example may include switching between a smile to a sincere look based on the same image.

Finally, the reference image may be used for creating a three-dimensional representation of the image which can allow rotating subjects or the creation of three dimensional representations of the scene such as holographic imaging or lenticular imaging.

Motion Correction

A reference image may include an image that differs from a main image in that it may have been captured at a different time before or after the main image. The reference image may have spatial differences such as movements of a subject or other object in a scene, and/or there may be a global movement of the camera itself. The reference image may, preferably in many cases, have lower resolution than the main image, thus saving valuable processing time, bytes, bitrate and/or memory, and there may be applications wherein a higher resolution reference image may be useful, and reference images may have a same resolution as the main image. The reference image may differ from the main image in a planar sense, e.g., the reference image can be infrared or Gray Scale, or include a two bit per color scheme, while the main image may be a full color image. Other parameters may differ such as illumination, while generally the reference image, to be useful, would typically have some common overlap with the main image, e.g., the reference image may be of at least a similar scene as the main image, and/or may be captured at least somewhat closely in time with the main image.

Some cameras (e.g., the Kodak V570, see http://www.dc-views.com/_kodak/v570.htm) have a pair of CCDs, which may have been designed to solve the problem of having a single zoom lens. A reference image can be captured at one CCD while the main image is being simultaneously captured with the second CCD, or two portions of a same CCD may be used for this purpose. In this case, the reference image is neither a preview nor a postview image, yet the reference image is a different image than the main image, and has some temporal or spatial overlap, connection or proximity with the main image. A same or different optical system may be used, e.g., lens, aperture, shutter, etc., while again this would typically involve some additional calibration. Such dual mode system may include a IR sensor, enhanced dynamic range, and/or special filters that may assist in various algorithms or processes.

In the context of blurring processes, i.e., either removing camera motion blur or adding blur to background sections of images, a blurred image may be used in combination with a non-blurred image to produce a final image having a non-blurred foreground and a blurred background. Both images may be deemed reference images which are each partly used to form a main final image, or one may be deemed a reference image having a portion combined into a main image. If two sensors are used, one could save a blurred image at the same time that the other takes a sharp image, while if only a single sensor is used, then the same sensor could take a blurred image followed by taking a sharp image, or vice-versa. A map of systematic dust artefact regions may be acquired using one or more reference images.

Reference images may also be used to disqualify or supplement images which have with unsatisfactory features such as faces with blinks, occlusions, or frowns.

Foreground/Background Processing

A method is provided for distinguishing between foreground and background regions of a digital image of a scene. The method includes capturing first and second images of nominally the same scene and storing the captured images in DCT-coded format. These images may include a main image and a reference image, and/or simply first and second images either of which images may comprise the main image. The first image may be taken with the foreground more in focus than the background, while the second image may be taken with the background more in focus than the foreground. Regions of the first image may be assigned as foreground or background according to whether the sum of selected high order DCT coefficients decreases or increases for equivalent regions of the second image. In accordance with the assigning, one or more processed images based on the first image or the second image, or both, are rendered at a digital rendering device, display or printer, or combinations thereof.

This method lends itself to efficient in-camera implementation due to the relatively less-complex nature of calculations utilized to perform the task.

In the present context, respective regions of two images of nominally the same scene are said to be equivalent if, in the case where the two images have the same resolution, the two regions correspond to substantially the same part of the scene. If, in the case where one image has a greater resolution than the other image, the part of the scene corresponding to the region of the higher resolution image is substantially wholly contained within the part of the scene corresponding to the region of the lower resolution image. Preferably, the two images are brought to the same resolution by sub-sampling the higher resolution image or upsampling the lower resolution image, or a combination thereof. The two images are preferably also aligned, sized or other process to bring them to overlapping as to whatsoever relevant parameters for matching.

Even after subsampling, upsampling and/or alignment, the two images may not be identical to each other due to slight camera movement or movement of subjects and/or objects within the scene. An additional stage of registering the two images may be utilized.

Where the first and second images are captured by a digital camera, the first image may be a relatively high resolution image, and the second image may be a relatively low resolution pre- or post-view version of the first image.

While the image is captured by a digital camera, the processing may be done in the camera as post processing, or externally in a separate device such as a personal computer or a server computer. In such case, both images can be stored. In the former embodiment, two DCT-coded images can be stored in volatile memory in the camera for as long as they are being used for foreground/background segmentation and final image production. In the latter embodiment, both images may be preferably stored in non-volatile memory. In the case of lower resolution pre-or-post view images, the lower resolution image may be stored as part of the file header of the higher resolution image.

In some cases only selected regions of the image are stored as two separated regions. Such cases include foreground regions that may surround faces in the picture. In one embodiment, if it is known that the images contain a face, as determined, for example, by a face detection algorithm, processing can be performed just on the region including and surrounding the face to increase the accuracy of delimiting the face from the background.

Inherent frequency information as to DCT blocks is used to provide and take the sum of high order DCT coefficients for a DCT block as an indicator of whether a block is in focus or not. Blocks whose high order frequency coefficients drop when the main subject moves out of focus are taken to be foreground with the remaining blocks representing background or border areas. Since the image acquisition and storage process in a digital camera typically codes captured images in DCT format as an intermediate step of the process, the method can be implemented in such cameras without substantial additional processing.

This technique is useful in cases where differentiation created by camera flash, as described in U.S. application Ser. No. 11/217,788, published as 2006/0039690, incorporated by reference (see also U.S. Ser. No. 11/421,027) may not be sufficient. The two techniques may also be advantageously combined to supplement one another.

Methods are provided that lend themselves to efficient in-camera implementation due to the computationally less rigorous nature of calculations used in performing the task in accordance with embodiments described herein.

A method is also provided for determining an orientation of an image relative to a digital image acquisition device based on a foreground/background analysis of two or more images of a scene.

According to certain embodiments, calculation of a complete highest resolution integral image for every acquired image in an image stream is not needed, and so such integral image calculations are reduced in an advantageous face tracking system. This either minimizes processing overhead for face detection and tracking or allows longer classifier chains to be employed during the frame-to-frame processing interval so providing higher quality results. This significantly improves the performance and/or accuracy of real-time face detection and tracking.

In certain embodiments, when a method is implemented in an image acquisition device during face detection, a sub-sampled copy of the acquired image is extracted from the camera hardware image acquisition subsystem and the integral image is calculated for this subsampled image. During face tracking, the integral image is only calculated for an image patch surrounding each candidate region.

In such an implementation, the process of face detection is spread across multiple frames. This approach is advantageous for effective implementation. In one example, digital image acquisition hardware is designed to subsample only to a single size. Certain embodiments take advantage of the fact that when composing a picture, a face will typically be present for multiple frames of an image stream. Significant efficiency is thus provided, while the reduction in computation does not impact significantly the initial detection of faces.

In the certain embodiments, the 3-4 smallest sizes (lowest resolution) of subsampled images are used in cycle. In some cases, such as when the focus of the camera is set to infinity, larger image subsamples may be included in the cycle as smaller (distant) faces may occur within the acquired image(s). In yet another embodiment, the number of sub-sampled images may change based on the estimated potential face sizes based on the estimated distance to the subject. Such distance may be estimated based on the focal length and focus distance, these acquisition parameters being available from other subsystems within the imaging appliance firmware.

By varying the resolution/scale of the sub-sampled image which is in turn used to produce the integral image, a single fixed size of classifier can be applied to the different sizes of integral image. Such an approach is particularly amenable to hardware embodiments where the subsampled image memory space can be scanned by a fixed size direct memory access (DMA) window and digital logic to implement a Haar-feature classifier chain can be applied to this DMA window. However, several sizes of classifier (in a software embodiment), or multiple fixed-size classifiers (in a hardware embodiment) could also be used.

An advantage is that from frame to frame only low resolution integral images are calculated.

In certain embodiments, a full resolution image patch surrounding each candidate face region is acquired prior to the acquisition of the next image frame. An integral image is then calculated for each such image patch and a multi-scaled face detector is applied to each such image patch. Regions which are found by the multi-scaled face detector to be face regions are referred to as confirmed face regions.

In one aspect, motion and audio queues are not used as described in Rui, which allows significantly more robust face detection and tracking to be achieved in a digital camera.

According to another embodiment, face tracking is used to detect a face region from a stream of images. Acquisition device firmware runs a face recognition algorithm at the location of the face using a database preferably stored on the acquisition device including personal identifiers and their associated face parameters. This mitigates the problems of algorithms using a single image for face detection and recognition which have lower probability of performing correctly.

In still further embodiments, an image acquisition device includes an orientation sensor which indicates a likely orientation of faces in acquired images. The determined camera orientation is fed to face detection processes which apply face detection according to the likely or predicted orientation of faces. This improves processing requirements and/or face detection accuracy.

In another embodiment, the performance of a face tracking module is improved by employing a motion sensor subsystem to indicate to the face tracking module, significant motions of an acquisition device during a face tracking sequence.

Without such a sensor, where the acquisition device is suddenly moved by the user rather than slowly panned across a scene, and candidate face regions in the next frame of a video sequence can be displaced beyond the immediate vicinity of the corresponding candidate region in the previous video frame and the face tracking module could fail to track the face requiring re-detection of the candidate.

In another embodiment, by only running the face detector on regions predominantly including skin tones, more relaxed face detection can be used, as there is a higher chance that these skin-tone regions do in fact contain a face. So, faster face detection can be employed to more effectively provide similar quality results to running face detection over the whole image with stricter face detection required to positively detect a face.

Referring To The Figures

FIG. 1 shows the primary subsystems of the face tracking system according to a preferred embodiment of the invention. The solid lines indicate the flow of image data; the dashed line indicate control inputs or information outputs (e.g. location(s) of detected faces) from a module. In this example an image processing apparatus can be a digital still camera (DSC), a video camera, a cell phone equipped with an image capturing mechanism or a hand help computer equipped with an internal or external camera.

A digital image is acquired in raw format from an image sensor (CCD or CMOS) [105] and an image subsampler [112] generates a smaller copy of the main image. Most digital cameras already contain dedicated hardware subsystems to perform image subsampling, for example to provide preview images to a camera display. Typically the subsampled image is provided in bitmap format (RGB or YCC). In the meantime the normal image acquisition chain performs post-processing on the raw image [110] which typically includes some luminance and color balancing. In certain digital imaging systems the subsampling may occur after such post-processing, or after certain post-processing filters are applied, but before the entire post-processing filter chain is completed.

The subsampled image is next passed to an integral image generator [115] which creates an integral image from the subsampled image. This integral image is next passed to a fixed size face detector [120]. The face detector is applied to the full integral image, but as this is an integral image of a subsampled copy of the main image, the processing required by the face detector is proportionately reduced. If the subsample is ¼ of the main image this implies the required processing time is only 25% of what would be required for the full image.

This approach is particularly amenable to hardware embodiments where the subsampled image memory space can be scanned by a fixed size DMA window and digital logic to implement a Haar-feature classifier chain can be applied to this DMA window. However we do not preclude the use of several sizes of classifier (in a software embodiment), or the use of multiple fixed-size classifiers (in a hardware embodiment). The key advantage is that a smaller integral image is calculated.

After application of the fast face detector [280] any newly detected candidate face regions [141] are passed onto a face tracking module [111] where any face regions confirmed from previous analysis [145] are merged with the new candidate face regions prior to being provided [142] to a face tracker [290].

The face tracker [290] as will be explained later provides a set of confirmed candidate regions [143] back to the tracking module [111]. Additional image processing filters are applied by the tracking module [111] to confirm either that these confirmed regions [143] are face regions or to maintain regions as candidates if they have not been confirmed as such by the face tracker [290]. A final set of face regions [145] can be output by the module [111] for use elsewhere in the camera or to be stored within or in association with an acquired image for later processing either within the camera or offline; as well as to be used in the next iteration of face tracking.

After the main image acquisition chain is completed a full-size copy of the main image [130] will normally reside in the system memory [140] of the image acquisition system. This may be accessed by a candidate region extractor [125] component of the face tracker [290] which selects image patches based on candidate face region data [142] obtained from the face tracking module [111]. These image patches for each candidate region are passed to an integral image generator [115] which passes the resulting integral images to a variable sized detector [121], as one possible example a VJ detector, which then applies a classifier chain, preferably at least a 32 classifier chain, to the integral image for each candidate region across a range of different scales.

The range of scales [144] employed by the face detector [121] is determined and supplied by the face tracking module [111] and is based partly on statistical information relating to the history of the current candidate face regions [142] and partly on external metadata determined from other subsystems within the image acquisition system.

As an example of the former, if a candidate face region has remained consistently at a particular size for a certain number of acquired image frames then the face detector [121] need only be applied at this particular scale and perhaps at one scale higher (i.e. 1.25 time larger) and one scale lower (i.e. 1.25 times lower).

As an example of the latter, if the focus of the image acquisition system has moved to infinity then it will be necessary to apply the smallest scalings in the face detector [121] Normally these scalings would not be employed as they must be applied a greater number of times to the candidate face region in order to cover it completely. It is worthwhile noting that the candidate face region will have a minimum size beyond which it not should decrease—this is in order to allow for localized movement of the camera by a user between frames. In some image acquisition systems which contain motion sensors it may be possible to track such localized movements and this information may be employed to further improved the selection of scales and the size of candidate regions.

The candidate region tracker [290] provides a set of confirmed face regions [143] based on full variable size face detection of the image patches to the face tracking module [111]. Clearly, some candidate regions will have been confirmed while others will have been rejected and these can be explicitly returned by the tracker [290] or can be calculated by the tracking module [111] by analysing the difference between the confirmed regions [143] and the candidate regions [142]. In either case, the face tracking module [111] can then apply alternative tests to candidate regions rejected by the tracker [290] (as explained below) to determine whether these should be maintained as candidate regions [142] for the next cycle of tracking or whether these should indeed be removed from tracking.

Once the set of confirmed candidate regions [145] has been determined by the face tracking module [111], the module [111] communicates with the sub-sampler [112] to determine when the next acquired image is to be sub-sampled and so provided to the detector [280] and also to provide the resolution [146] at which the next acquired image is to be sub-sampled.

It will be seen that where the detector [280] does not run when the next image is acquired, the candidate regions [142] provided to the extractor [125] for the next acquired image will be the regions [145] confirmed by the tracking module [111] from the last acquired image. On the other hand, when the face detector [280] provides a new set of candidate regions [141] to the face tracking module [111], these candidate regions are merged with the previous set of confirmed regions [145] to provide the set of candidate regions [142] to the extractor [125] for the next acquired image.

Figure 2:
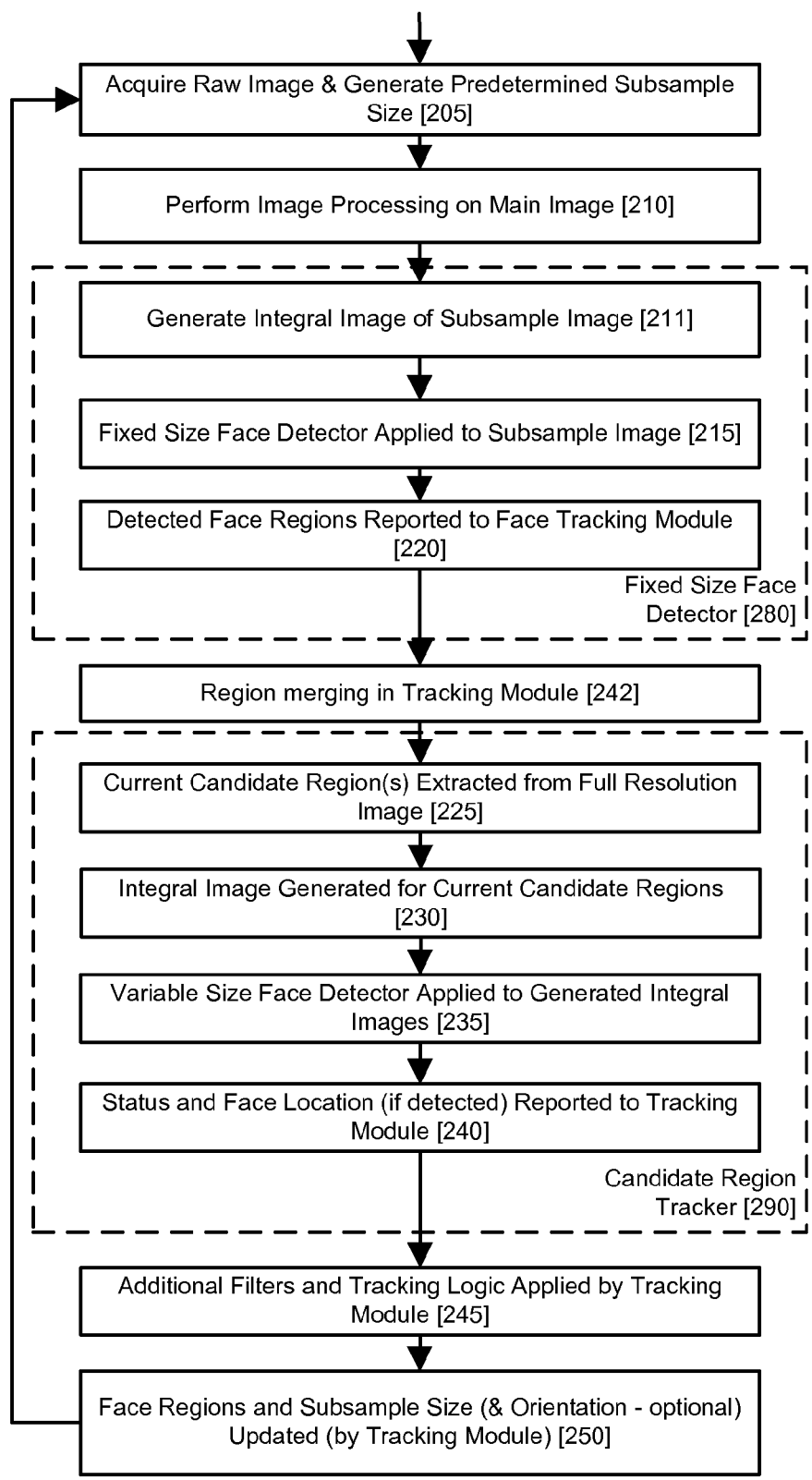
FIG. 2 is a flow diagram illustrating the operation of the image processing apparatus of FIG. 1.
Figure 3A:
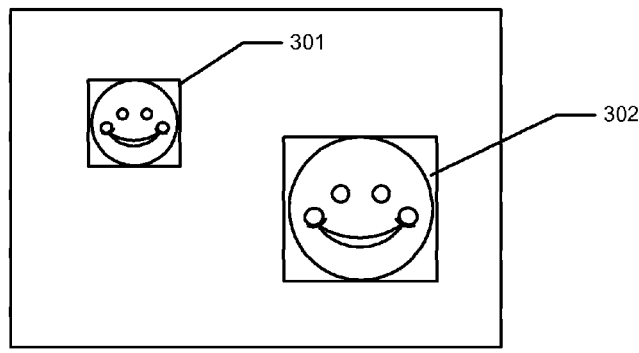
FIGS. 3(a) to (d) shows examples of images processed by the apparatus of the preferred embodiment.
Figure 3B:
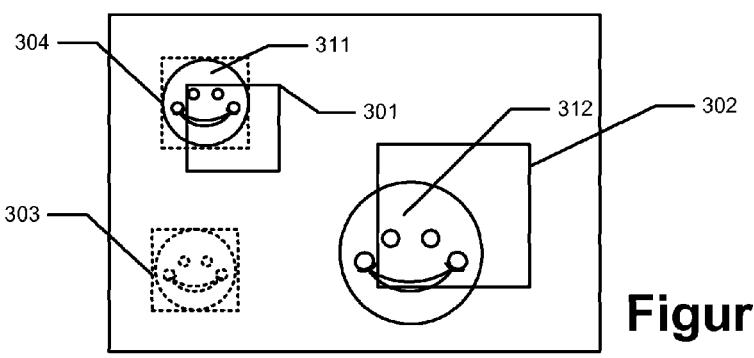
Figure 3C:
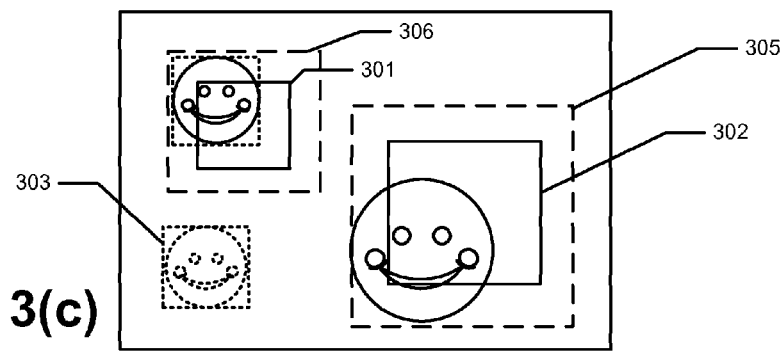
Figure 3D:
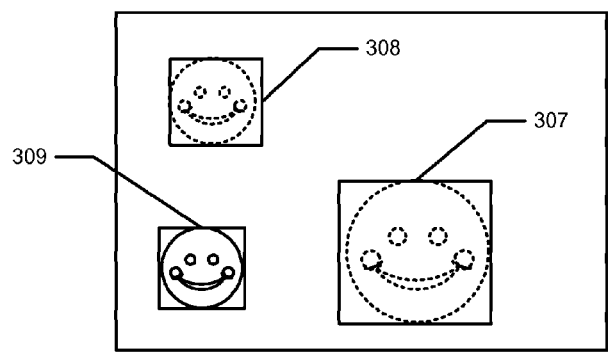

FIG. 2 shows the main workflow in more detail. The process is split into (i) a detection/initialization phase which finds new candidate face regions [141] using the fast face detector [280] which operates on a subsampled version of the full image; (ii) a secondary face detection process [290] which operates on extracted image patches for the candidate regions [142], which are determined based on the location of faces in one or more previously acquired image frames and (iii) a main tracking process which computes and stores a statistical history of confirmed face regions [143]. Although we show the application of the fast face detector [280] occurring prior to the application of the candidate region tracker [290] the order is not critical and the fast detection is not necessarily executed on every frame or in certain circumstances may be spread across multiple frames.

Thus, in step 205 the main image is acquired and in step 210 primary image processing of that main image is performed as described in relation to FIG. 1. The sub-sampled image is generated by the subsampler [112] and an integral image is generated therefrom by the generator [115], step 211 as described previously. The integral image is passed to the fixed size face detector [120] and the fixed size window provides a set of candidate face regions [141] within the integral image to the face tracking module, step 220. The size of these regions is determined by the sub-sampling scale [146] specified by the face tracking module to the sub-sampler and this scale is based on the analysis of the previous sub-sampled/integral images by the detector [280] and patches from previous acquired images by the tracker [290] as well as other inputs such as camera focus and movement.

The set of candidate regions [141] is merged with the existing set of confirmed regions [145] to produce a merged set of candidate regions [142] to be provided for confirmation, step 242.

For the candidate regions [142] specified by the face tracking module 111, the candidate region extractor [125] extracts the corresponding full resolution patches from an acquired image, step 225. An integral image is generated for each extracted patch, step 230 and a variable sized face detection is applied by the face detector 121 to each such integral image patch, for example, a full Violla-Jones analysis. These results [143] are in turn fed back to the face-tracking module [111], step 240.

The tracking module [111] processes these regions [143] further before a set of confirmed regions [145] is output. In this regard, additional filters can be applied by the module 111 either for regions [143] confirmed by the tracker [290] or for retaining candidate regions [142] which may not have been confirmed by the tracker 290 or picked up by the detector [280], step 245.

For example, if a face region had been tracked over a sequence of acquired images and then lost, a skin prototype could be applied to the region by the module [111] to check if a subject facing the camera had just turned away. If so, this candidate region could be maintained for checking in the next acquired image to see if the subject turns back to face the camera.

Depending on the sizes of the confirmed regions being maintained at any given time and the history of their sizes, e.g. are they getting bigger or smaller, the module 111, determines the scale [146] for sub-sampling the next acquired image to be analysed by the detector [280] and provides this to the sub-sampler [112], step 250.

It will be seen that typically the fast face detector [280] need not run on every acquired image. So for example, where only a single source of sub-sampled images is available, if a camera acquires 60 frames per second, 15-25 sub-sampled frames per second (fps) may be required to be provided to the camera display for user previewing. Clearly, these images need to be sub-sampled at the same scale and at a high enough resolution for the display. Some or all of the remaining 35-45 fps can be sampled at the scale required by the tracking module [111] for face detection and tracking purposes.

The decision on the periodicity in which images are being selected from the stream may be based on a fixed number or alternatively be a run-time variable. In such cases, the decision on the next sampled image may be determined on the processing time it took for the previous image, in order to maintain synchronicity between the captured real-time stream and the face tracking processing. Thus in a complex image environment the sample rate may decrease.

Alternatively, the decision on the next sample may also be performed based on processing of the content of selected images. If there is no significant change in the image stream, the full face tracking process will not need to be performed. In such cases, although the sampling rate may be constant, the images will undergo a simple image comparison and only if it is decided that there is justifiable differences, will the face tracking algorithms be launched.

It will also be noted that the face detector [280] need not run at regular intervals. So for example, if the camera focus is changed significantly, then the face detector may need to run more frequently and particularly with differing scales of sub-sampled image to try to detecting faces which should be changing in size. Alternatively, where focus is changing rapidly, the detector [280] could be skipped for intervening frames, until focus has stabilised. However, it is generally only when focus goes to infinity that the highest resolution integral image must be produced by the generator [115].

In this latter case, the detector may not be able to cover the entire area of the acquired, subsampled, image in a single frame. Accordingly the detector may be applied across only a portion of the acquired, subsampled, image on a first frame, and across the remaining portion(s) of the image on subsequent acquired image frames. In a preferred embodiment the detector is applied to the outer regions of the acquired image on a first acquired image frame in order to catch small faces entering the image from its periphery, and on subsequent frames to more central regions of the image.

An alternative way of limiting the areas of an image to which the face detector 120 is to be applied comprises identifying areas of the image which include skin tones. U.S. Pat. No. 6,661,907 discloses one such technique for detecting skin tones and subsequently only applying face detection in regions having a predominant skin colour.

In one embodiment of the present invention, skin segmentation 190 is preferably applied to the sub-sampled version of the acquired image. If the resolution of the sub-sampled version is not sufficient, then a previous image stored image store 150 or a next sub-sampled image can be used as long as the two image are not too different in content from the current acquired image. Alternatively, skin segmentation 190 can be applied to the full size video image 130.

In any case, regions containing skin tones are identified by bounding rectangles and these bounding rectangles are provided to the integral image generator 115 which produces integral image patches corresponding to the rectangles in a manner similar to the tracker integral image generator 115.

Not alone does this approach reduce the processing overhead associated with producing the integral image and running face detection, but in the present embodiment, it also allows the face detector 120 to apply more relaxed face detection to the bounding rectangles, as there is a higher chance that these skin-tone regions do in fact contain a face. So for a VJ detector 120, a shorter classifier chain can be employed to more effectively provide similar quality results to running face detection over the whole image with longer VJ classifiers required to positively detect a face.

Further improvements to face detection are also possible. For example, it has been found that face detection is very dependent on illumination conditions and so small variations in illumination can cause face detection to fail, causing somewhat unstable detection behavior.

In present embodiment, confirmed face regions 145 are used to identity regions of a subsequently acquired sub-sampled image on which luminance correction should be performed to bring the regions of interest of the image to be analyzed to the desired parameters. One example of such correction is to improve the luminance contrast within the regions of the subsampled image defined by the confirmed face regions 145.

Contrast enhancement is well-known and is typically used to increased the local contrast of an image, especially when the usable data of the image is represented by close contrast values. Through this adjustment, the intensities for pixels of a region when represented on a histogram which would otherwise be closely distributed can be better distributed. This allows for areas of lower local contrast to gain a higher contrast without affecting the global contrast. Histogram equalization accomplishes this by effectively spreading out the most frequent intensity values.

The method is useful in images with backgrounds and foregrounds that are both bright or both dark. In particular, the method can lead to better detail in photographs that are over or under-exposed.

Alternatively, this luminance correction could be included in the computation of an "adjusted" integral image in the generators 115.

In another improvement, when face detection is being used, the camera application is set to dynamically modify the exposure from the computed default to a higher values (from frame to frame, slightly overexposing the scene) until the face detection provides a lock onto a face.

In a separate embodiment, the face detector 120 will be applied only to the regions that are substantively different between images. Note that prior to comparing two sampled images for change in content, a stage of registration between the images may be needed to remove the variability of changes in camera, caused by camera movement such as zoom, pan and tilt.

It will be seen that it is possible to obtain zoom information from camera firmware and it is also possible using software techniques which analyse images in camera memory 140 or image store 150 to determine the degree of pan or tilt of the camera from one image to another.

However, in one embodiment, the acquisition device is provided with a motion sensor 180, FIG. 1, to determine the degree and direction of pan from one image to another so avoiding the processing requirement of determining camera movement in software.

Many digital cameras have begun to incorporate such motion sensors—normally based on accelerometers, but optionally based on gyroscopic principals—within the camera, primarily for the purposes of warning or compensating for hand shake during main image capture. U.S. Pat. No. 4,448,510, Murakoshi discloses such a system for a conventional camera, or U.S. Pat. No. 6,747,690, Molgaard discloses accelerometer sensors applied within a modern digital camera.

Where a motion sensor is incorporated in a camera it will typically be optimized for small movements around the optical axis. A typical accelerometer incorporates a sensing module which generates a signal based on the acceleration experienced and an amplifier module which determines the range of accelerations which can effectively be measured. Modern accelerometers allow software control of the amplifier stage which allows the sensitivity to be adjusted.

The motion sensor 180 could equally be implemented with MEMS sensors of the sort which will be incorporated in next generation consumer cameras and camera-phones.

In any case, when the camera is operable in face tracking mode, i.e. constant video acquisition as distinct from acquiring a main image, shake compensation is typically not used because image quality is lower. This provides the opportunity to configure the motion sensor 180, to sense large movements, by setting the motion sensor amplifier module to low gain. The size and direction of movement detected by the sensor 180 is provided to the face tracker 111. The approximate size of faces being tracked is already known and this enables an estimate of the distance of each face from the camera. Accordingly, knowing the approximate size of the large movement from the sensor 180 allows the approximate displacement of each candidate face region to be determined, even if they are at differing distances from the camera.

Thus, when a large movement is detected, the face tracker 111 shifts the location of candidate regions as a function of the direction and size of the movement. Alternatively, the size of the region over which the tracking algorithms are applied may also be enlarged (and, if necessary, the sophistication of the tracker may be decreased to compensate for scanning a larger image area) as a function of the direction and size of the movement.

When the camera is actuated to capture a main image, or when it exits face tracking mode for any other reason, the amplifier gain of the motion sensor 180 is returned to normal, allowing the main image acquisition chain 105,110 for full-sized images to employ normal shake compensation algorithms based on information from the motion sensor 180. In alternative embodiments, sub-sampled preview images for the camera display can be fed through a separate pipe than the images being fed to and supplied from the image sub-sampler [112] and so every acquired image and its sub-sampled copies can be available both to the detector [280] as well as for camera display.

In addition to periodically acquiring samples from a video stream, the process may also be applied to a single still image acquired by a digital camera. In this case, the stream for the face tracking comprises a stream of preview images and the final image in the series is the full resolution acquired image. In such a case, the face tracking information can be verified for the final image in a similar fashion to that described in FIG. 2. In addition, the information such as coordinates or mask of the face may be stored with the final image. Such data for example may fit as an entry in the saved image header, for future post processing, whether in the acquisition device or at a later stage by an external device.

Turning now to FIG. 3 which illustrates the operation of the preferred embodiment through a worked example. FIG. 3: (a) illustrates the result at the end of a detection & tracking cycle on a frame of video; two confirmed face regions [301, 302] of different scales are shown. In the present embodiment, for pragmatic reasons, each face region has a rectangular bounding box; as it is easier to make computations on rectangular regions. This information is recorded and output as [145] by the tracking module [111] of FIG. 1.

Based on the history of the face regions [301,302], the tracking module [111] decides to run fast face tracking with a classifier window of the size of face region [301] with an integral image being provided and analysed accordingly.

FIG. 3(*b*) shows the situation after the next frame in a video sequence is captured and the fast face detector has been applied to the new image. Both faces have moved [311, 312] and are shown relative to the previous face regions [301, 302]. A third face region [303] has appeared and has been detected by the fast face detector [303]. In addition the fast face detector has found the smaller of the two previously confirmed faces [304] because it is at the correct scale for the fast face detector. Regions [303] and [304] are supplied as candidate regions [141] to the tracking module [111]. The tracking module merges this new candidate region information [141], with the previous confirmed region information [145] comprising regions [301] [302] to provide a set of candidate regions comprising regions [303],[304] and [302] to the candidate region extractor [290]. The tracking module [111] knows that the region [302] has not been picked up by the detector [280]. This may be because the face has in either disappeared, remains at a size that could not have been detected by the detector [280] or has changed size to a size that could not have been detected by the detector [280]. Thus, for this region, the module [111] will specify a large patch [305], FIG. 3(*c*) around the region [302] to be checked by the tracker [290]. Only the region [303] bounding the newly detected face candidate needs to be checked by the tracker [290], whereas because the face [301] is moving a relatively large patch [306] surrounding this region is specified to the tracker [290].

FIG. 3(*c*) shows the situation after the candidate region extractor operates upon the image; candidate regions [306, 305] around both of the confirmed face regions [301, 302] from the previous video frame as well as new region [303] are extracted from the full resolution image [130]; the size of these candidate regions having been calculated by the face tracking module based partly on partly on statistical information relating to the history of the current face candidate and partly on external metadata determined from other sub-systems within the image acquisition system. These extracted candidate regions are now passed on to the variable sized face detector [121] which applies a VJ face detector to the candidate region over a range of scales; the locations of any confirmed face regions are then passed back to the face tracking module [111].

FIG. 3(*d*) shows the situation after the face tracking module [111] has merged the results from both the fast face detector [280] and the face tracker [290] and applied various confirmation filters to the confirmed face regions. Three confirmed face regions have been detected [307, 308, 309] within the patches [305,306,303]. The largest region [307] was known but had moved from the previous video frame and relevant data is added to the history of that face region. The other previously known region [308] which had moved was also detected by the fast face detector which serves as a double-confirmation and these data are added to its history. Finally a new face region [303] was detected and confirmed and a new face region history must be initiated for this newly detected face. These three face regions are used to provide a set of confirmed face regions [145] for the next cycle.

It will be seen that there are many possible applications for the regions 145 supplied by the face tracking module. For example, the bounding boxes for each of the regions [145] can be superimposed on the camera display to indicate that the camera is automatically tracking detected face(s) in a scene. This can be used for improving various pre-capture parameters. One example is exposure, ensuring that the faces are well exposed. Another example is auto-focussing, by ensuring that focus is set on a detected face or indeed to adjust other capture settings for the optimal representation of the face in an image.

The corrections may be done as part of the pre-processing adjustments. The location of the face tracking may also be used for post processing and in particular selective post processing where the regions with the faces may be enhanced. Such examples include sharpening, enhancing saturation, brightening or increasing local contrast. The preprocessing using the location of faces may also be used on the regions without the face to reduce their visual importance, for example through selective blurring, desaturation, or darkening.

Where several face regions are being tracked, then the longest lived or largest face can be used for focussing and can be highlighted as such. Also, the regions [145] can be used to limit the areas on which for example red-eye processing is performed when required.

Other post-processing which can be used in conjunction with the light-weight face detection described above is face recognition. In particular, such an approach can be useful when combined with more robust face detection and recognition either running on the same or an off-line device that has sufficient resources to run more resource consuming algorithms In this case, the face tracking module [111] reports the location of any confirmed face regions [145] to the in-camera firmware, preferably together with a confidence factor.

When the confidence factor is sufficiently high for a region, indicating that at least one face is in fact present in an image frame, the camera firmware runs a light-weight face recognition algorithm [160] at the location of the face, for example a DCT-based algorithm. The face recognition algorithm [160] uses a database [161] preferably stored on the camera comprising personal identifiers and their associated face parameters.

In operation, the module [160] collects identifiers over a series of frames. When the identifiers of a detected face tracked over a number of preview frames are predominantly of one particular person, that person is deemed by the recognition module to be present in the image. The identifier of the person, and the last known location of the face, is stored either in the image (in a header) or in a separate file stored on the camera storage [150]. This storing of the person's ID can occur even when the recognition module [160] failed for the immediately previous number of frames but for which a face region was still detected and tracked by the module [111].

When the image is copied from camera storage to a display or permanent storage device such as a PC (not shown), the person ID's are copied along with the images. Such devices are generally more capable of running a more robust face detection and recognition algorithm and then combining the results with the recognition results from the camera, giving more weight to recognition results from the robust face recognition (if any). The combined identification results are presented to the user, or if identification was not possible, the user is asked to enter the name of the person that was found. When the user rejects an identification or a new name is entered, the PC retrains its face print database and downloads the appropriate changes to the capture device for storage in the light-weight database [161].

It will be seen that when multiple confirmed face regions [145] are detected, the recognition module [160] can detect and recognize multiple persons in the image.

It is possible to introduce a mode in the camera that does not take a shot until persons are recognized or until it is clear that persons are not present in the face print database, or alternatively displays an appropriate indicator when the persons have been recognized. This would allow reliable identification of persons in the image.

This aspect of the present system solves the problem where algorithms using a single image for face detection and recognition may have lower probability of performing correctly. In one example, for recognition, if the face is not aligned within certain strict limits it is not possible to accurately recognize a person. This method uses a series of preview frames for this purpose as it can be expected that a reliable face recognition can be done when many more variations of slightly different samples are available.

Further improvements to the efficiency of the system described above are possible. For example, conventional face detection algorithms typically employ methods or use classifiers to detect faces in a picture at different orientations: 0, 90, 180 and 270 degrees.

According to a further aspect, the camera is equipped with an orientation sensor 170, FIG. 1. This can comprise a hardware sensor for determining whether the camera is being held upright, inverted or tilted clockwise or anti-clockwise. Alternatively, the orientation sensor can comprise an image analysis module connected either to the image acquisition hardware 105, 110 or camera memory 140 or image store 150 for quickly determining whether images are being acquired in portrait or landscape mode and whether the camera is tilted clockwise or anti-clockwise.

Once this determination is made, the camera orientation can be fed to one or both of the face detectors 120, 121. The detectors need then only apply face detection according to the likely orientation of faces in an image acquired with the determined camera orientation. This aspect of the invention can either significantly reduce the face detection processing overhead, for example, by avoiding the need to employ classifiers which are unlikely to detect faces or increase its accuracy by running classifiers more likely to detects faces in a given orientation more often.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

In addition, in methods that may be performed according to the claims below and/or preferred embodiments herein, the operations have been described in selected typographical sequences. However, the sequences have been selected and so ordered for typographical convenience and are not intended to imply any particular order for performing the operations, unless a particular ordering is expressly provided or understood by those skilled in the art as being necessary.

In addition, all references cited herein, as well as the background, invention summary, abstract and brief description of the drawings, are incorporated by reference into the detailed description of the preferred embodiments as disclosing alternative embodiments, including:

U.S. Pat. Nos. RE33682, RE31370, 4,047,187, 4,317,991, 4,367,027, 4,448,510, 4,638,364, 5,291,234, 5,450,504, 5,488,429, 5,638,136, 5,710,833, 5,724,456, 5,781,650, 5,805,727, 5,812,193, 5,818,975, 5,835,616, 5,870,138, 5,900,909, 5,949,904, 5,978,519, 5,991,456, 6,035,072, 6,097,470, 6,101,271, 6,125,213, 6,128,397, 6,148,092, 6,151,073, 6,160,923, 6,188,777, 6,192,149, 6,233,364, 6,249,315, 6,263,113, 6,266,054, 6,268,939, 6,282,317, 6,298,166, 6,301,370, 6,301,440, 6,332,033, 6,393,148, 6,404,900, 6,407,777, 6,421,468, 6,438,264, 6,456,732, 6,459,436, 6,473,199, 6,501,857, 6,504,942, 6,504,951, 6,516,154, 6,526,161, 6,614,946, 6,621,867, 6,661,907, 6,747,690, 6,873,743, 6,965,684, 7,031,548, and 7,035,462;

US published patent applications nos. 2001/0031142, 2002/0051571, 2002/0090133, 2002/0102024, 2002/0105662, 2002/0114535, 2002/0176623, 2002/0172419, 20020126893, 2002/0102024, 2003/0025812, 2003/0039402, 2003/0052991, 2003/0071908, 2003/0091225, 2003/0193604, 2003/0219172, 2004/0013286, 2004/0013304, 20040037460, 2004/0041121, 2004/0057623, 2004/0076335, 2004/0119851, 2004/0120598, 2004/0223063, 2005/0031224, 2005/0041121, 2005/0047655, 2005/0047656, 2005/0068446, 2005/0078173, 2005/0140801, 2005/0147278, 20050232490, 2006/0120599, 2006/0039690, 2006/0098237, 2006/0098890, 2006/0098891, 2006/0140455, 2006/0204055, 2006/0204110, 2006/0285754, and 2007/0269108

U.S. patent application Ser. No. 11/764,339;
European application EP1128316 to Ray et al.;
Japanese patent application no. JP5260360A2;
British patent application no. GB0031423.7;
Published PCT application no. WO-03/019473;
PCT Applications Nos. PCT/EP2004/008706, and PCT/EP2004/010199;
http://homepages.inf.ed.ac.uk/rbf/CVonline/LOCAL_COPIES/FAVARO1/dfdtutorial.html;

Anlauf, J. K. and Biehl, M.: "The adatron: and adaptive perception algorithm". Neurophysics Letters, 10:687-692, 1989;

Baluja & Rowley, "Neural Network-Based Face Detection," IEEE Transactions on Pattern Analysis and Machine Intelligence, Vol. 20, No. 1, pages 23-28, January 1998;

Baluja, Shumeet in "Face Detection with In-Plane rotation: Early Concepts and Preliminary Results", Technical Report JPRC-TR-97-001;

Endo, M., "Perception of upside-down faces: and analysis form the viewpoint of cue saliency", in Ellis, H. Jeeves, M., Newcombe, F., and Young, A., editors, Aspects of Face Processing, 53-58, 1986, Matnus Nijhoff Publishers;

Moses, Yael and Ullman, Shimon and Shimon Edelman in "Generalization to Novel Images in Upright and Inverted Faces", 1994;

Le Saux, Bertrand and Amato, Giuseppe: "Image Classifiers for Scene Analysis", International Conference on Computer Vision and Graphics (ICCVG'04), Warsaw, Poland, September 2004;

Valentine, T., Upside Down Faces: A review of the effect of inversion and encoding activity upon face recognition", 1988, Acta Psychologica, 61:259-273;

Viola and Jones "Robust Real Time Object Detection", 2nd international workshop on Statistical and Computational theories of Vision, in Vancouver, Canada, Jul. 31, 2001;

Yang et al., IEEE Transactions on Pattern Analysis and Machine Intelligence, Vol. 24, no. 1, pp 34-58 (January 2002);

Motion Deblurring Using Hybrid Imaging", by Moshe Ben-Ezra and Shree K. Nayar, from the Proceedings IEEE Computer Society Conference on Computer Vision and Pattern Recognition, 2003;

"Automatic Multidimensional Deconvolution" J. Opt. Soc. Am. A, vol. 4(1), pp. 180-188, January 1987 to Lane et al;

"Some Implications of Zero Sheets for Blind Deconvolution and Phase Retrieval", J. Optical Soc. Am. A, vol. 7, pp. 468-479, 1990 to Bates et al;

Iterative Blind Deconvolution Algorithm Applied to Phase Retrieval", J. Opt. Soc. Am. A, vol. 7(3), pp. 428-433, March 1990. to Seldin et al;

"Deconvolution and Phase Retrieval With Use of Zero Sheets," J. Optical Soc. Am. A, vol. 12, pp. 1,842-1,857, 1995 to Bones et al.;

"Digital Image Restoration", Prentice Hall, 1977 authored by Andrews, H. C. and Hunt, B. R., and "Deconvolution of Images and Spectra" 2nd. Edition, Academic Press, 1997, edited by Jannson, Peter A.

What is claimed is:

1. A method of tracking a face in a reference image stream, comprising:
using a digital image acquisition device including an imaging optical system, and a processor, for obtaining metadata to apply to a further action, wherein the method includes:
acquiring an image stream including multiple reference images each including one or more face regions;
identifying one or more face regions within two or more of said reference images;
determining a relative movement between said two or more reference images;
determining a size and location of said one or more face regions within each of said two or more reference images;
applying concentrated face detection to at least a portion of at least one of the multiple reference images in a predicted location for candidate face regions having a predicted size as a function of the determined relative movement and the size and location of said one or more face regions within said reference images, to provide a set of candidate face regions; and
applying meta-data of one or more of the set of candidate face regions to a further action.

2. A method as claimed in claim 1 wherein said indication of relative movement comprises an amount and direction of movement.

3. A method as claimed in claim 1 wherein said adjusted face detection comprises: prior to applying face detection, shifting said associated set of candidate face regions as a function of said relative movement.

4. A method as claimed in claim 3, further comprising shifting said face regions as a function of their size and as a function of said relative movement.

5. A method as claimed in claim 1 wherein said adjusted face detection comprises: applying face detection to a region of a next acquired image comprising candidate regions corresponding to the previously acquired image expanded as a function of said relative movement.

6. A method as claimed in claim 5, wherein said candidate regions of said next acquired image are expanded as a function of their original size and as a function of said relative movement.

7. A method as claimed in claim 1, further comprising selectively applying face recognition using a database to at least some of said candidate face regions to provide an identifier for each of one or more faces recognized in the candidate face regions; and storing said identifier for said each recognized face in association with at least one image of said image stream.

8. A method as claimed in claim 1 further comprising tracking candidate face regions of different sizes from a plurality of images of said image stream.

9. A method as claimed in claim 1 further comprising merging said set of candidate face regions with one or more previously detected face regions to provide a set of candidate face regions having different parameters.

10. A method as claimed in claim 1, wherein the method is performed periodically on a selected plurality of images of a reference image stream, wherein said plurality of images includes a temporal sequence of acquired images.

11. A method as claimed in claim 1, further comprising displaying at least one acquired image and superimposing one or more indications of one or more tracked candidate face regions on said displayed acquired image.

12. A method as claimed in claim 11 further comprising storing at least one of the size and location of one or more of said set of candidate face regions in association with the at least one acquired image.

13. A method a claimed in claim 1, wherein said multiple reference images comprise a stream of preview images.

14. A digital image acquisition device configured to detect faces in an image stream, comprising:
one or more optics and a sensor for acquiring said image stream, and
a processor programmed by code embedded within a processor-readable medium to perform a method of tracking faces in the image stream, wherein the method comprises:
receiving an image stream including multiple reference images that include one or more face regions;
receiving an indication of relative movement between at least two images of the image stream, a first image of said images having an associated set of candidate face regions each having a given size and a respective location; and
applying adjusted face detection to at least a portion of a second of the at least two images in the vicinity of said candidate face regions as a function of said movement, to provide an updated set of candidate face regions; and
applying meta-data of one or more of the set of candidate face regions to a further action.

15. The image acquisition device as claimed in claim 14, further comprising a motion sensor, said motion sensor comprising an accelerometer and a controlled gain amplifier connected to said accelerometer, said apparatus being arranged to set the gain of said amplifier relatively low for acquiring a high resolution image and to set the gain of said amplifier relatively high during acquisition of a stream of relatively low resolution images.

16. The image acquisition device as claimed in claim 14 including a motion sensor, said motion sensor comprising a MEMS sensor.

17. The image acquisition device as claimed in claim 14, wherein the method further comprises selectively applying face recognition using a database to at least some of said candidate face regions to provide an identifier for a face recognized in a candidate face region, and storing the identifier for the recognized face in association with the first or second image, or both.

18. The image acquisition device as claimed in claim 14, wherein the method further comprises merging new candidate face regions with one or more previously detected face regions to provide said updated set of candidate face regions.

19. The image acquisition device as claimed in claim 14, wherein the method further comprises displaying an acquired image; and superimposing an indication of a tracked candidate face region on the displayed acquired image.

20. The image acquisition device as claimed in claim 19, wherein the method further comprises storing at least one of the size and location of a candidate face region in association with the first or second image, or both.

21. The image acquisition device of as claimed in claim 14, wherein said image stream comprises a stream of preview images.

22. One or more processor-readable media having code embedded therein for programming a processor to perform a method of tracking a face in an image stream including multiple reference images, wherein the method comprises:
programming a processor-based digital image acquisition device including an imaging optical system, and a processor, for obtaining meta-data to apply to a further action, wherein the method further includes:
identifying one or more face regions within two or more of said reference images, including at least a first and a second reference image;
determining a relative movement between said two or more reference images;
determining a size and location of said one or more face regions within each of said two or more reference images;
applying concentrated face detection to at least a portion of said second image of two or more of said reference images in a predicted location for candidate face regions having a predicted size as a function of the determined relative movement and the size and location of said one or more face regions within said first image of said two or more of said references images, to provide a set of candidate face regions for said second image of said two or more of said reference images; and
applying meta-data of one or more of the set of candidate face regions to a further action.

23. The one or more processor-readable media as claimed in claim 22 wherein said indication of relative movement comprises an amount and direction of movement.

24. The one or more processor-readable media as claimed in claim 22 wherein said adjusted face detection comprises: prior to applying face detection, shifting said associated set of candidate face regions as a function of said movement.

25. The one or more processor-readable media as claimed in claim 24, wherein the method further comprises shifting said face regions as a function of their size and as a function of said movement.

26. The one or more processor-readable media as claimed in claim 22 wherein said adjusted face detection comprises: applying face detection to a region of the second image comprising candidate regions corresponding to the first image expanded as a function of said movement.

27. The one or more processor-readable media as claimed in claim 26, wherein said candidate regions of said second image are expanded as a function of their original size and as a function of said movement.

28. The one or more processor-readable media as claimed in claim 22, wherein the method further comprises selectively apply face recognition using a database to at least some of said candidate face regions to provide an identifier for each of one or more faces recognized in the candidate face regions; and storing said identifier for said each recognized face in association with at least one image of said image stream.

29. The one or more processor-readable media as claimed in claim 22 wherein the method further comprises tracking candidate face regions of different sizes from a plurality of images of said image stream.

30. The one or more processor-readable media as claimed in claim 22 wherein the method further comprises merging said set of candidate face regions with one or more previously detected face regions to provide a set of candidate face regions having different parameters.

31. The one or more processor-readable media as claimed in claim 22, wherein the method is performed periodically on a selected plurality of images of the image stream, wherein said plurality of images include a main acquired image chronologically following a plurality of preview images.

32. The one or more processor-readable media as claimed in claim 22, wherein the method further comprises displaying a current image and superimposing one or more indications of one or more tracked candidate face regions on said displayed current image.

33. The one or more processor-readable media as claimed in claim 32 wherein the method further comprises storing at least one of the size and location of one or more of said set of candidate face regions in association with said current image.

34. The one or more processor-readable media a claimed in claim 22, wherein said image stream comprises a stream of preview images.

* * * * *